United States Patent
Rouse et al.

(10) Patent No.: US 6,808,742 B2
(45) Date of Patent: Oct. 26, 2004

(54) PREPARATION OF THIN SILICA FILMS WITH CONTROLLED THICKNESS AND TUNABLE REFRACTIVE INDEX

(75) Inventors: Jason H. Rouse, South Orange, NJ (US); Gregory S. Ferguson, Bethlehm, PA (US)

(73) Assignee: Competitive Technologies, Inc., Fairfield, CT (US)

( * ) Notice: Subject to any disclaimer, the term of this patent is extended or adjusted under 35 U.S.C. 154(b) by 0 days.

(21) Appl. No.: 10/384,188

(22) Filed: Mar. 7, 2003

(65) Prior Publication Data

US 2003/0228420 A1 Dec. 11, 2003

Related U.S. Application Data

(60) Provisional application No. 60/362,435, filed on Mar. 7, 2002.

(51) Int. Cl.[7] .................................................. B05D 5/06
(52) U.S. Cl. .................... 427/162; 427/344; 427/376.2; 427/402
(58) Field of Search ................................. 427/162, 344, 427/376.2, 402, 301, 248.1; 428/688, 446

(56) References Cited

U.S. PATENT DOCUMENTS

| | | | | |
|---|---|---|---|---|
| 5,519,803 A | * | 5/1996 | Shiono et al. | 385/132 |
| 6,329,017 B1 | * | 12/2001 | Liu et al. | 427/240 |
| 6,544,618 B1 | * | 4/2003 | Smith | 428/69 |
| 2003/0152759 A1 | * | 8/2003 | Chao et al. | 428/307.3 |

OTHER PUBLICATIONS

Rouse, Jason H. and Ferguson, Gregory S., "Preparation of Thin Silica films with Controlled Thickness and Tunable Refractive", J.Am. Chem. Soc. 2003, vol. 125, pp. 15529–15536.

Lvov, Yuri et al., "High–Speed Multilayer Film Assembly by Alternate Adsorption of Silica Nanoparticles and Linear Poycation", Chem. Commun., 1998, pp. 1229–1230.

Lvov, Yuri, et al., "Alternate Assembly of Ordered Multi-layers of SiO2 and Other Nanoparticles and Polyions", American Chemical Society, 1997, Langmuir 1997, vol. 13, pp. 6195–6203.

Ariga, Katsuhiko, et al., "Alternately Assembled Ultrathin Film of Silica Nanoparticles and Linear Polycations", Chemistry Letters 1997, pp. 125–126.

* cited by examiner

*Primary Examiner*—Bret Chen
(74) *Attorney, Agent, or Firm*—Paul A. Levitsky; Martin M. Novack

(57) ABSTRACT

A method of forming a porous silica film includes the following steps: a) providing a substrate; b) coating, on a surface of the substrate, a layer of charged polyelectrolyte; and c) applying an aged silica-bearing non-colloidal solution to the coated surface of the substrate to adsorb porous silica thereon. The adsorption cycle of steps (b) and (c) is repeated a number of times to control film thickness. The age and concentration of the silica-bearing solution are selected to control the porosity and the index of refraction of the porous silica film.

26 Claims, 10 Drawing Sheets

PREPARATION OF THIN SILICA FILMS WITH CONTROLLED THICKNESS AND TUNABLE REFRACTIVE INDEX

RELATED APPLICATION

Priority is claimed from U.S. Provisional Patent Application No. 60/362,435, filed Mar. 7, 2002, and said U.S. Provisional Patent Application is incorporated herein by reference.

FIELD OF THE INVENTION

This invention relates to the field of silica films and the preparation thereof and, more particularly, to preparation of thin silica films with controlled thickness and tunable refractive index.

BACKGROUND OF THE INVENTION

Porous silica films are currently of technological interest in applications ranging from low-dielectric constant ("low-k") materials (see e.g. Prakash, S. S.; Brinker, C. J.; Hurd, A. J.; Rao, S. M. *Nature* 1995, 374, 439; Prakash, S. S.; Brinker, C. J.; Hurd, A. J. *J. Non-Cryst. Solids* 1995, 190, 264; Zhao, D.; Feng, J.; Huo, Q.; Melosh, N.; Fredrickson, G. H.; Chmelka, B. F.; Stucky, G. D. *Science* 1998, 279, 548; Zhao, D.; Yang, P.; Melosh, N.; Feng, J.; Chmelka, B. F.; Stucky, G. D. *Adv. Mater.* 1998, 10, 1380; Hguyen, C.; Hawker, C. J.; Miller, R. D.; Huang, E.; Hedrick, J. L.; Gauderon, R.; Hilborn, J. G. *Macromolecules* 2000, 33, 4281; Nguyen, C. V.; Carter, K. R.; Hawker, C. J.; Hedrick, J. L.; Jaffe, R. L.; Miller, R. D.; Remenar, J. F.; Rhee, H.-W.; Rice, P. M.; Toney, M. F.; Trollsas, M.; Yoon, D. Y. *Chem. Mater.* 1999, 11, 3080; Hendrick, J. L.; Miller, R. D.; Hawker, C. J.; Carter, K. R.; Volksen, W.; Yoon, D. Y.; Trollsas, M. *Adv. Mater.* 1998, 10, 1049; Doshi, D. A.; Huesing, N. K.; Lu, M.; Fan, H.; Lu, Y.; Simmons-Potter, K.; Potter Jr., B. G.; Hurd, A. J.; Brinker, C. J. *Science* 2000, 290, 107; Baskaran, S.; Liu, J.; Domansky, K.; Kohler, N.; Xiahong, L.; Coyle, C.; Fryxell, G. E.; Thevuthasan, S.; Williford, R. E. *Adv. Mater.* 2000, 12, 291; Jin, C. M.; Luttmar, J. D.; Smith, D. M.; Ramos, T. A. *Mater. Res. Soc. Bull.* 1997, 22, 39; Nguyen, S. V. *IBM J. Res. Dev.* 1999, 43, 109) to anti-reflective coatings (see e.g. Uhlmann, D. R.; Suratwala, T.; Davidson, K.; Boulton, J. M.; Toewee, G. *J. Non-Cryst. Solids* 1997, 218, 113; Martinu, L.; Poitras, D. *J. Vac. Sci. Technol. A* 2000, 18, 2619) to molecular separations (see e.g. de Vos, R. M.; Maier, W. F.; Verweij, H. *J. Membr. Sci.* 1999, 158, 277; de Vos, R. M.; Verweij, H. *J. Membr. Sci.* 1998, 143, 37; de Vos, R. M.; Verweij, H. *Science* 1998, 279, 1710; Yang, H.; Coombs, N.; Sokolov, I.; Ozin, G. A. *Nature* 1996, 381, 589; Lu, Y.; Ganguli, R.; Drewien, C. A.; Anderson, M. T.; Brinker, C. J.; Gong, W.; Guo, Y.; Soyez, H.; Dunn, B.; Huang, M. H.; Zink, J. I. *Nature* 1997, 389, 364; Cot, L.; Ayral, A.; Durand, J.; Guizard, C.; Hovnanian, N.; Julbe, A.; Larbot, A. *Solid State Sci.* 2000, 2, 313). Standard routes to these materials include the chemical vapor deposition (CVD) of silicon oxide precursors (see e.g. Martinu, L.; Poitras, D. *J. Vac. Sci. Technol. A* 2000, 18, 2619); and the spin- or dip-coating of partially hydrolyzed silicon alkoxide solutions, i.e., sol-gel chemistry. (see e.g. Binker, C. J.; Scherer, G. W. *Sol-Gel Science: The Physics and Chemistry of Sol-Gel Processing*, Academic Press: New York, 1990). Depending on the processing conditions used in sol-gel chemistry, the resulting film can be allowed to condense during removal of the solvent to form a material of low to medium porosity (xerogel), or the pore liquid can be extracted by supercritical drying to produce porosities of up to 99.9% (aerogel). Recently, it has been shown that by modifying the gel with organosilanes prior to solvent removal, aerogels can also be formed without the need for supercritical drying (see e.g. Prakash, S. S.; Brinker, C. J.; Hurd, A. J.; Rao, S. M. *Nature* 1995, 374, 439. Prakash, S. S.; Brinker, C. J.; Hurd, A. J. *J. Non-Cryst. Solids* 1995, 190, 264).

It is among the objects of the present invention to produce silica films with good control over film porosity and film thickness. This simultaneous control of both parameters is important because it fully defines the optical pathlength within the films.

SUMMARY OF THE INVENTION

An embodiment of the method hereof for forming porous films relies on the well-established behavior of polyionic species to adsorb readily onto a surface of opposite charge, reported initially by Iler in the mid 1960s, (see e.g. Iler, R. K. *J. Colloid Interface Sci.* 1966, 21, 569) but attracting a great deal of interest more recently (see e.g. Kleinfeld, E. R.; Ferguson, G. S. *Science* 1944, 265, 370; Decher, G.; Hong, J. D. *Ber. Bunsenges. Phys. Chem.* 1991, 95, 1430. Keller, S. W.; Kim, H.-N.; Mallouk, T. E. *J. Am. Chem. Soc.* 1994, 116, 8817. For a review of stepwise multilayer self-assembly techniques, see: Decher, G. *Science* 1997, 277, 1232). Oligomeric silica species can be adsorbed from sols derived from tetraethylorthosilicate (TEOS) onto substrates bearing a very thin (~6 Å) layer of positively charged polyelectrolyte. Furthermore, by varying the conditions used to prepare the sol, robust films can be prepared with refractive indices in the range of 1.16–1.31. Although the prior art includes reported adsorptions of colloidal silica, (see e.g. Iler, R. K. *J. Colloid Interface Sci.* 1966, 21, 569; Lvov, Y. M.; Rusling, J. F.; Thomsen, D. L.; Papadimitrikopoulos, F.; Kawakami, T.; Kunitake, T. *Chem. Commun.* 1998, 1229. Lvov, Y.; Ariga, K.; Onda, M.; Ichinose, I.; Kunitake, T. *Langmuir* 1997, 13, 6195. Ariga, K.; Lvov, Y.; Onda, M.; Ichinose, I.; Kunitake, T. *Chem. Lett.* 1997, 125) the method hereof allows unprecedented control of the amount of porosity within these films.

In accordance with an embodiment hereof, a method of forming a porous silica film is set forth comprising the following steps: a) providing a substrate; b) coating, on a surface of the substrate, a layer of charged polyelectrolyte; and c) applying an aged silica-bearing non-colloidal solution to the coated surface of the substrate to adsorb porous silica thereon. The steps (b) and (c) together comprise an adsorption cycle, and the adsorption cycle is repeated a number of times to control film thickness. In a preferred embodiment of the invention, the silica-bearing solution is an aqueous solution of TEOS and a base. In this embodiment the step (b) of coating on a surface of the substrate a layer of charged polyelectrolyte comprises applying to the surface an aqueous solution of PDDA. The age and concentration of the silica-bearing solution are selected to control the porosity and the index of refraction of the porous silica film.

Further features and advantages of the invention will become more readily apparent from the following detailed description when taken in conjunction with the accompanying drawings.

DETAILED DESCRIPTION

Sols were prepared by first allowing an aqueous solution of TEOS (0.01 M) to stir for 2 h. A sufficient amount of aqueous sodium hydroxide was then added to produce either a 35:1 (sol A) or a 175:1 (sol B) molar ratio of TEOS to base. The corresponding initial concentration of base in these solutions were ~0.28 mM and ~0.057 mM for sol A and sol B, respectively. The resulting solution was allowed to age stirring until use. A third sol (sol C) was prepared by adding the TEOS directly to aqueous sodium hydroxide to produce a 0.01 M TEOS solution having an initial 175:1 molar ratio of TEOS to base. This solution was also stirred until use. Substrates used for film formation were rectangular (100)-oriented silicon wafers bearing a hydroxylated native oxide surface, with a size of ~1 cm by 3.5 cm. To form a film, the substrate was dipped into a 0.25% (w/w) aqueous solution of poly(diallydimethylammonium chloride) (PDDA) for 3 min, then removed and rinsed with deionized water and dried with nitrogen. After rinsing and drying a second time, the film was placed into a stirred aqueous TEOS sol for 3 min. The rinsing and drying procedure was then repeated. A treatment with PDDA followed by one with a TEOS sol constitutes a single adsorption cycle.

Figure 1:
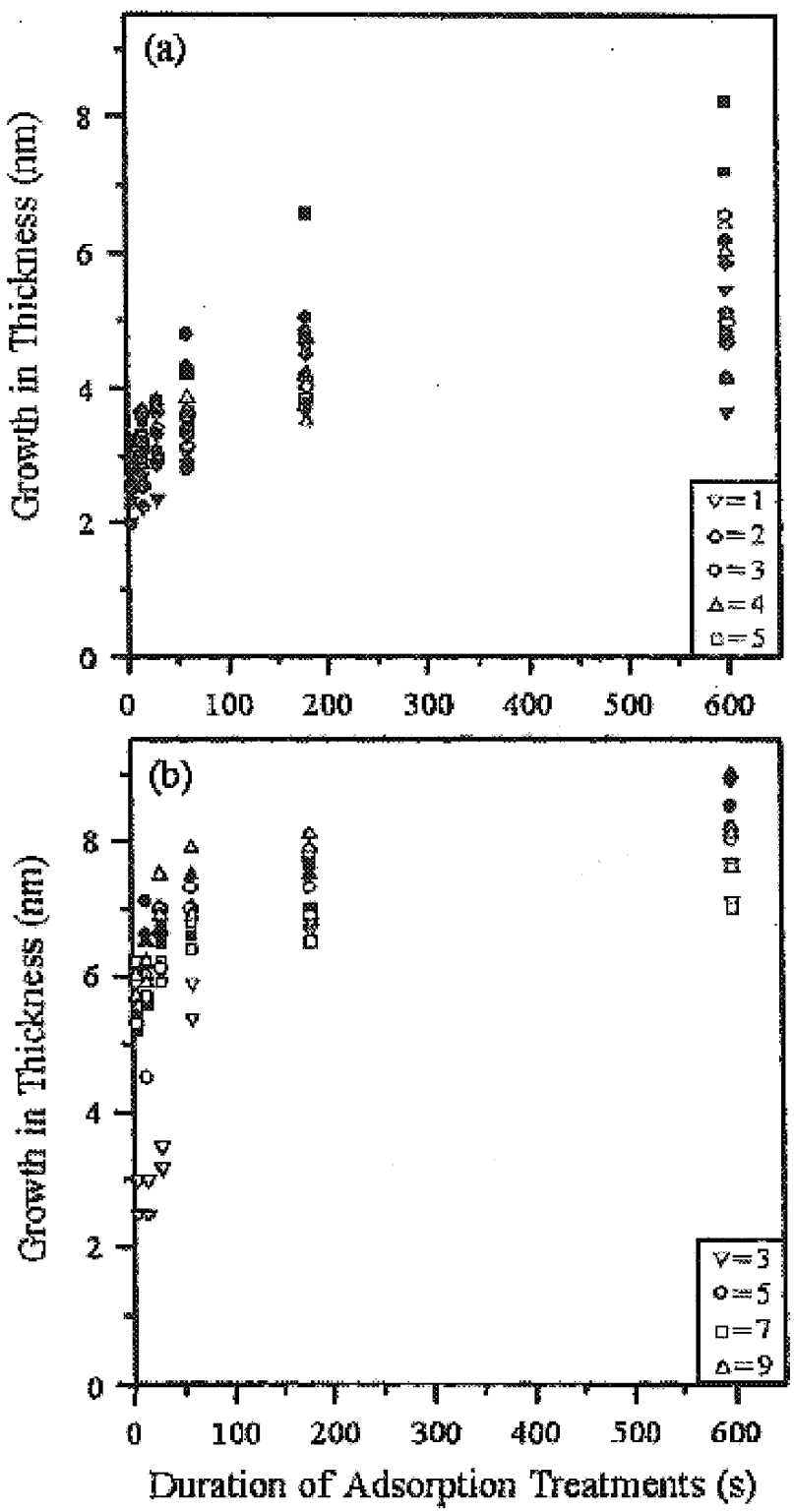
FIG. 1 shows dependence of film growth on the duration of the adsorption treatments with 0.25% (w/w) PDDA and either sol A (a) or sol B (b). The same amount of adsorption time was used for both components, each point corresponds to a single sample (two for each adsorption time). The shape of the symbol indicates the age of the sol in days (see legend), and the shading of the symbol represents samples prepared from the same batch of sol. Substrates for this study were silicon wafers that had been treated with two cycles of PDDA and the sol studied (15 s adsorption times). All thicknesses were calculated assuming a refractive index of 1.30 for films prepared with sol A, and a refractive index of 1.25 for films prepared with sol B.

The choice of 3-min adsorption times resulted from the following kinetics experiments on the adsorptions performed using sols A and B. Substrates used in the kinetics experiments were first treated with two adsorption cycles using 0.25% (w/w) PDDA and the sol of interest. A ~15 sec adsorption time was used for each component, to minimize any substrate effects on the adsorption process. Films were then adsorbed onto the pretreated substrates from 0.25% (w/w) PDDA and the sol of interest for various amounts of time—5 s, 15 s, 30 s, 1 min, 3 min, 10 min. The same adsorption time was used for both the PDDA and the sol. For the short treatment times (5, 15, and 30 s), the component solutions were pipetted onto the substrate surface, though for the longer treatments the substrate was immersed into the component solutions. Because the composition of a sol depends on the length of time it has aged, kinetic data were obtained not only as a function of adsorption time but also as a function of the age of the sol (i.e., 1 d, 2 d, etc.). Adsorption data obtained for sol A are shown in FIG. 1a. Each data point corresponds to the average of three measurements taken on a particular sample, and a separate sample was used for each point. The data show that a region of slow growth in the amount adsorbed is not reached until at least ~3 min of adsorption time, and that for sols aged between 1 and 3 d, the amount adsorbed at the steady-state was reproducible.

Analogous kinetics experiments preformed with sol B are shown in FIG. 1b. Unlike sol A, from which adsorption was detected after only 1 d of aging, no adsorption of silica from sol B was found until the sol had aged for at least 3 d. For a sol aged for 3 days, a plateau in growth was reached after 3 min of adsorption time, and for sols aged longer amounts of time (i.e., 5, 7, and 9 d), an approximate plateau was reached after only 1 min. In the regime of slower growth (the "plateau"), the average adsorbed amount was approximately 70% greater than for sol A. Given that a 3-min adsorption time was sufficient to reach the regime of slow growth for both sols, we chose that amount of time for the preparation of films from all three sols examined in this study.

Figure 2:
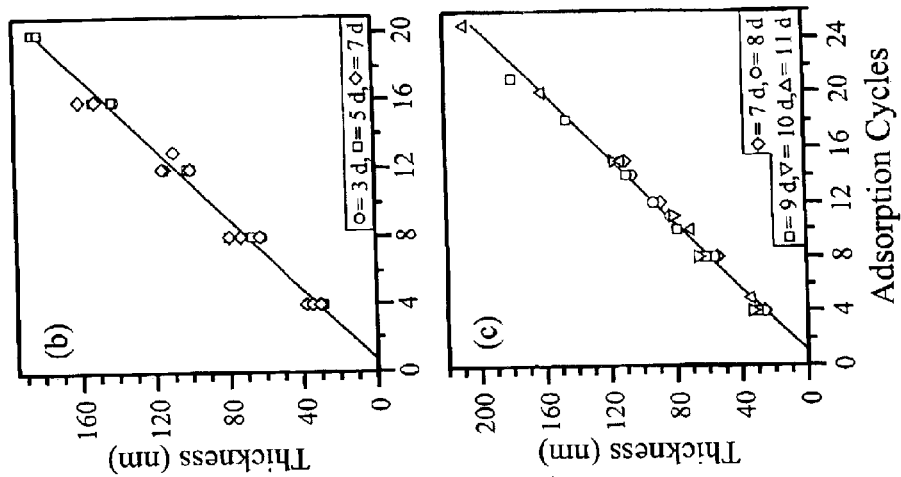
FIG. 2 shows (a) Increase in ellipsometric thickness of multilayer films formed from 0.25% (w/w) PDDA and sol A as a function of the number of adsorption cycles and age of the sol. The shading of the symbols indicates films prepared from the same batch of sol, and the shape of symbol indicates the number of days the sol was aged (see legend). (b and c) Analogous data obtained for sols B and C. For clarity, data for films from all batches of sol were plotted using the same color. The lines are linear least-squares fits to all of the data. Film thicknesses for all three graphs were calculated using the refractive index determined for each individual film, a range of 1.29–1.31, 1.24–1.26, and 1.16–1.18, for sols A, B, and C, respectively.
Figure 2:
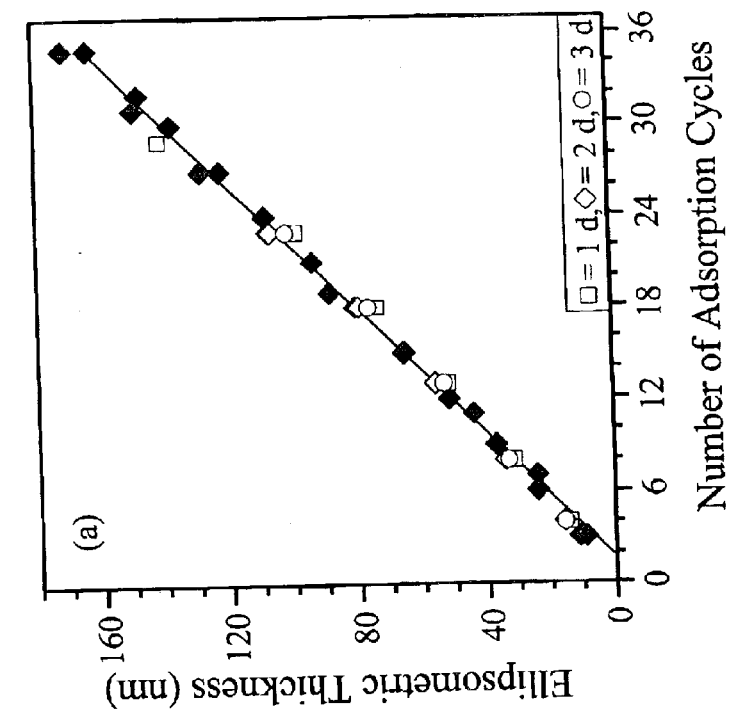

Optical ellipsometry was used both to monitor the growth in thickness of the sequentially adsorbed films and to determined the refractive index of films having a thickness greater than ~80 nm (see e.g. Tompkins, H. G. *A User's Guide to Ellipsometry*; Academic Press: Boston, 1993, Chapters 1–3). As an example, growth data obtained for sol A are shown in FIG. 2a. All of the ellipsometric measurements were taken with the sample under nitrogen at a relative humidity of 4–7% to minimize the effect of sorption of ambient water vapor within these hydrophilic films (vide infra). Because the composition of a sol depends on the length of time it has aged, films were produced from three different batches of sol and after various aging times (1–3 d, as noted). These sols produced nearly identical linear growth rates, indicating both the reproducibility of the sol formation, as well as its stability and adsorption characteristics, over 1 to 3 d. A linear fit to all of the data gave an average growth per cycle of 4.7±0.1 nm, consistent with that determined from the kinetics of adsorption study. The refractive indices determined ellipsometrically for these films were in the range of 1.29–1.31, a value significantly lower than that of bulk silica (~1.46) (see e.g. *Handbook of Chemistry and Physics*, 73$^{rd}$ Edition; Lide, D. R. Ed.; CRC Press: Boca Raton, Fla., 1992, p 4–95).

Increasing the molar ratio of TEOS to base from 35:1 to 175:1 (sol B) gave films having refractive indices of 1.24–1.26. Films prepared from four different batches of sol and analyzed after various days of aging gave reproducible day-to-day and batch-to-batch growth (FIG. 2b). The average growth per cycle roughly doubled from that found for sol A, to 9.5±0.3 nm. A value slightly higher than that found during the kinetics study. Using the same 175:1 molar ratio of TEOS to base, but with the TEOS added directly to the base solution (sol C), gave films with even lower refractive indices, 1.16–1.18. Longer aging times were needed for this sol: no growth occurred until the sol had aged for at least 6 d, and uniform films resulted only after the sol had aged for at least 7 d. The average growth per cycle for films prepared from three batches of sol C that had aged for between 7 and 11 d was 8.4±0.3 nm (FIG. 2c).

Figure 3:
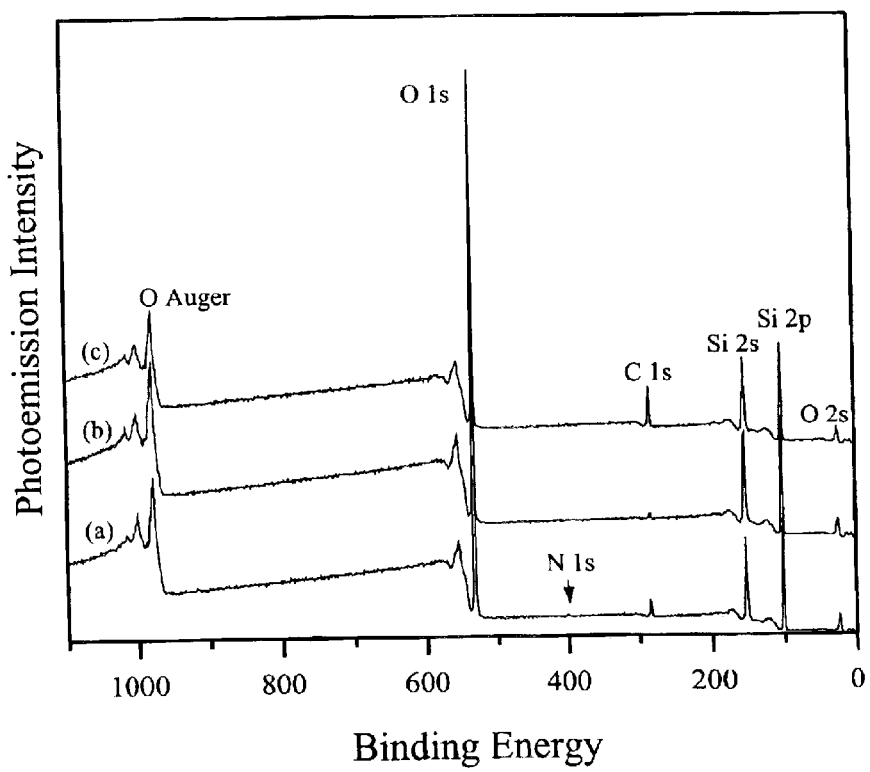
FIG. 3 shows survey XPS spectra of a multilayer film from PDDA and sol A: (a) as-adsorbed, (b) after heating at 500° C. in air for 10 h, and (c) after treatment with trimethylchlorosilane (vide infra).

To determine the relative amounts of PDDA and silica incorporated within these films, the outer surface of a film was analyzed by x-ray photoelectron spectroscopy (XPS). Survey spectra at a 90° takeoff angle between the detector and the sample surface revealed that the interfacial region of both films contained oxygen, silicon, carbon and nitrogen, as expected. The survey spectra obtained from the film prepared from sol A is shown in FIG. 3a. High-resolution spectra (also at a 90° takeoff angle) of the film prepared from sol A revealed mostly oxygen (59.1%) and silicon (33.6%), with a small amount of carbon (6.7%) and very little nitrogen (0.6%). After accounting for the amount of carbon and nitrogen associated with the PDDA, based on the nitrogen 1 s photoemission, the amount of excess carbon was only 5.5%. If the excess carbon were all due to unhydrolyzed ethoxy groups of the TEOS, it would represent ~98% hydrolysis of the ethoxy-silicon groups. With the film containing only ~2% PDDA "glue", the ~4.7 nm growth per cycle can be almost completely attributed to the adsorbed silica. For comparison, the film prepared from sol C contained 5.6% carbon and only 0.6% nitrogen.

Figure 4:
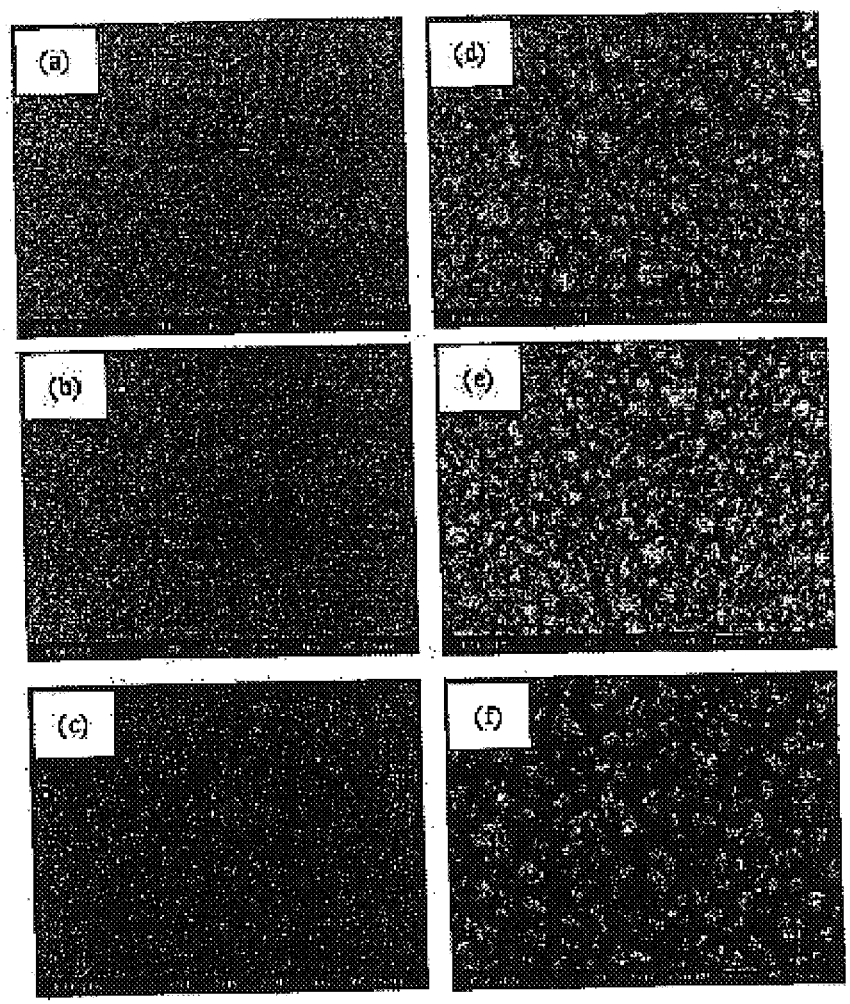
FIG. 4 shows top-down scanning electron micrographs (SEM) of as-adsorbed films prepared from sol A (a and d), sol B (b and e), and sol C (c and f). The scale bars in micrographs a–c are 1 $\mu$m in length (5,000 magnification) and in d–f are 100 nm in length (100,000 magnification).
Figure 5:
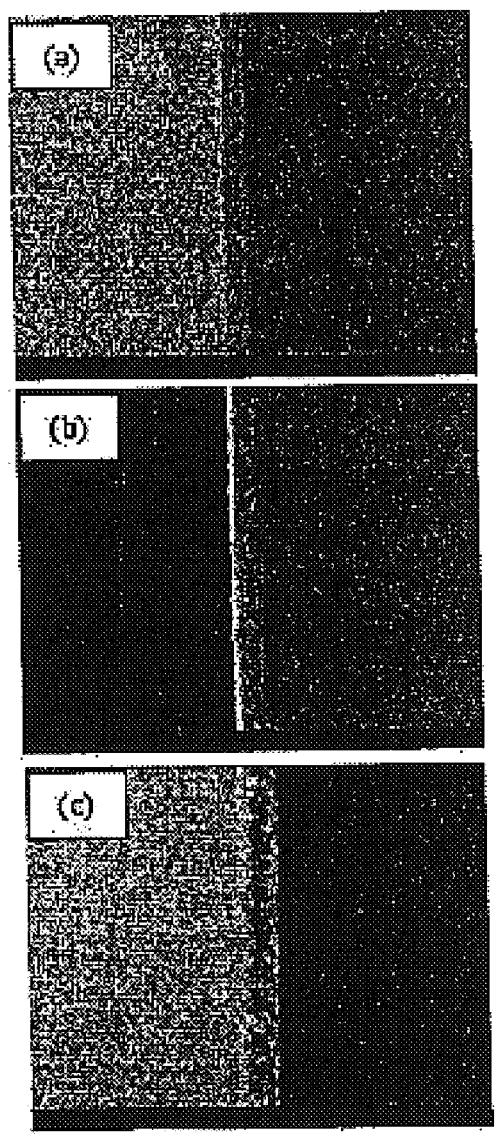
FIG. 5 shows cross-sectional SEM micrographs of the same films imaged in FIG. 4: sol A (a), sol B (b), and sol C (c). The scale bars in these micrographs are 100 nm in length (35,000 magnification). The substrates (right side) in these images are silicon wafers.
Figure 6:
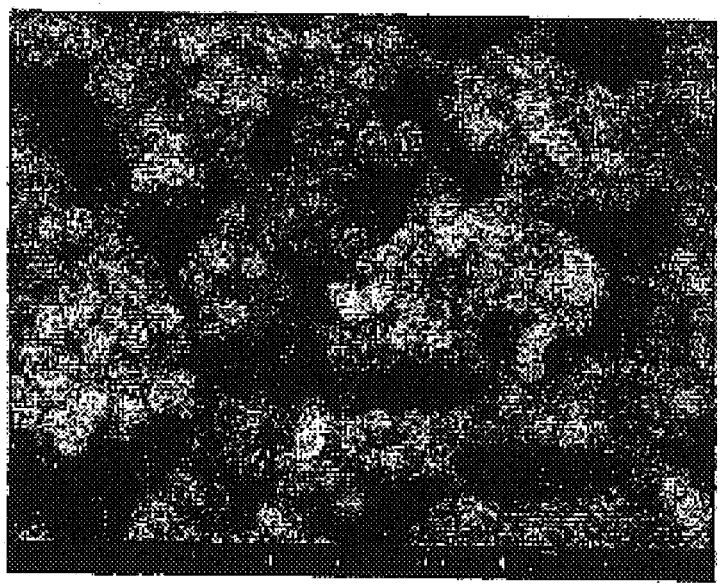
FIG. 6 shows (top) High-magnification top-down SEM of the same film imaged in FIGS. 4c and e (sol C) and (bottom) a high-magnification-cross-sectional SEM of the same film. Images were obtained on a JEOL 6700 FESEM.
Figure 6:
Figure 7:
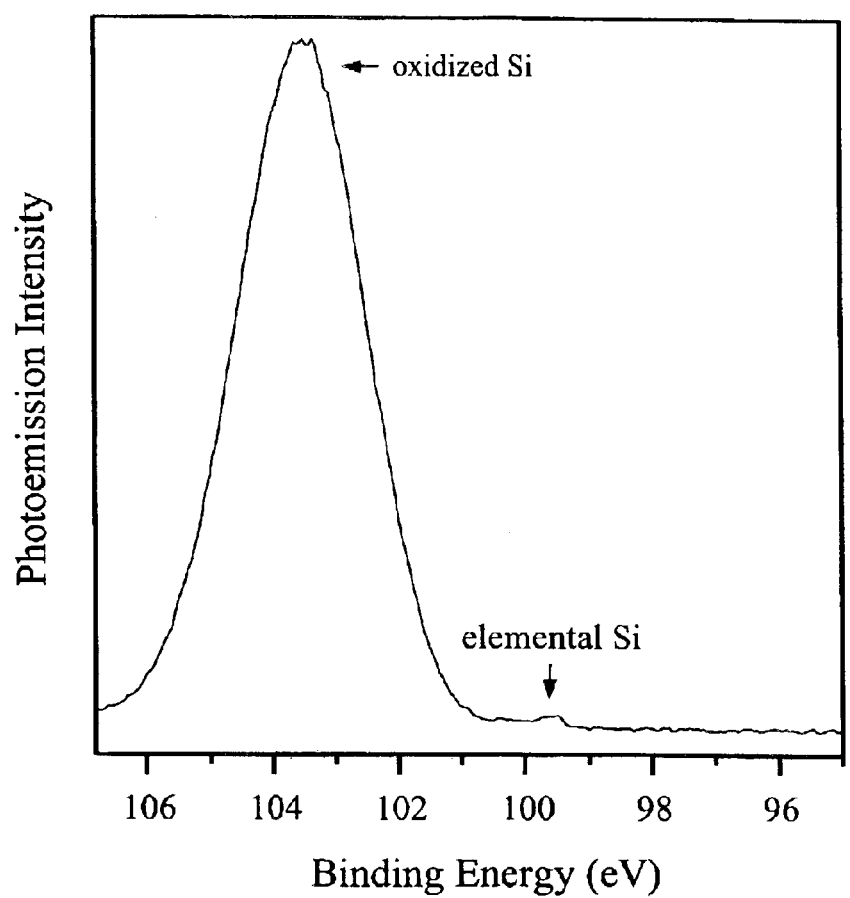
FIG. 7 shows high-resolution XPS spectum in the Si 2p region of a 119-nm-thick film prepared with sol C, showing the presence of elemental silicon at ~99.5 eV from the underlying substrate.
Figure 8:
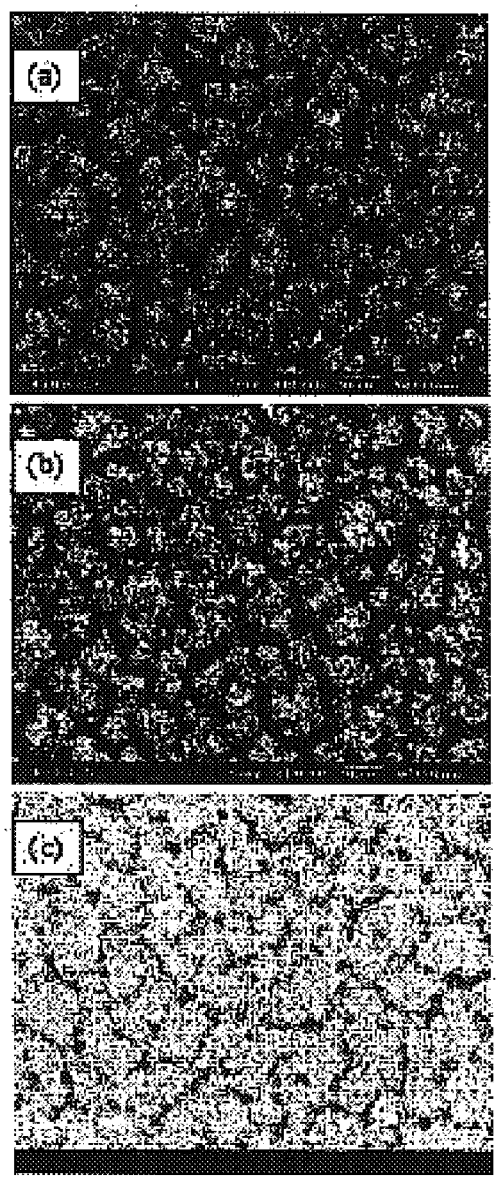
FIG. 8 shows scanning electrom micrographs of the film prepared from sol C obtained at different accelerating voltages: (a) 2 kV, (b) 5 kV, and (c) 10 kV. The scale bars in these micrographs are 100 nm in length (100,000 magnification).

The thickness and refractive index over the surface area of these films was remarkably even: the average of four measurements across these films always agreed within ±2%. A consequence of the uniformity in the optical pathlength of these films was an uniformity in their color caused by interference of visible light reflected from the air-film interface with that reflected from the film-substrate interface (see e.g. Kleinfeld, E. R.; Ferguson, G. S. *Science* 1944, 265, 370; Decher, G.; Hong, J. D.; Schmitt, J. *Thin Solid Films* 1992, 210/211, 831. Tillman, A.; Ulman, A.; Penner, T. L. *Langmuir* 1989, 5, 101. Pliskin, W. A.; Conrad, E. E. *IBM J. Res. Dev.* 1964, 8, 43. Blodgett, K. B. *J. Am. Chem. Soc.* 1935, 57, 1007) Neither the sol nor the polyelectrolyte contain a chromophore. The film index also affected the intensity of this interference color: as the index decreased, the color became fainter, presumably due to less light being reflected from the air-film interface and a slight blue-shift occurring in the interference wavelength. The volume fraction of air within such a material can be estimated from its refractive index according to the Lorentz-Lorenz relationship: (see e.g. Binker, C. J.; Scherer, G. W. *Sol-Gel Science: The Physics and Chemistry of Sol-Gel Processing*, Academic Press: New York, 1990; Born, M.; Wolf, E. *Principles of Optics*; Pergamon: New York, 1980, pp 87–88)

$$(n_f^2-1)/(n_f^2+2)=(1-V_p)(n_s^2-1)(n_s^2+2) \tag{1}$$

where $n_f$ is the film index, $V_p$ is the void volume fraction, and $n_s$ is the refractive index of the solid framework. Given the absence of crystalline structure within these films (absence of Bragg peaks in x-ray diffractograms), the index of amorphous silica (1.46) was assumed for the framework here. From equation 1, as the index of the films decreased from 1.30±0.1 (sol A) to 1.25±0.1 (sol B) to 1.17±0.1 (sol C), the $V_p$ increased from 0.31±0.02 to 0.40±0.2 to 0.60±0.01, respectively. To understand how the porosity is incorporated within these films, the morphology of a film prepared from each sol was analyzed by scanning electron microscopy (SEM). Low-magnification images of the surface of all three of the films showed a very uniform coating of small (~100 nm) particles, with no cracks or other imperfections present (FIG. 4a, b, and c). At higher magnification (FIG. 4d, e, and f), however, significant differences in topography are evident. The packing density of the particles was clearly lower for the films of lower refractive index, indicating that the low index of these films is due to an increased amount of interparticle void space. Additional evidence for the variation in film structure from sol-to-sol was provided by cross-sectional SEM. All three films examined had uniform thicknesses consistent with those obtained by ellipsometry: the SEM thicknesses were within 10% of the ellipsometric thicknesses. Again, the film prepared from sol C (FIG. 5c) showed a more diffuse structure than those prepared from either sol A (FIG. 5a) or sol B (FIG. 5b). Higher resolution micrographs (FIG. 6) of the film prepared from sol C clearly shows that the ~100-nm particles in FIG. 4e are actually aggregates of smaller (~10-nm) particles, a morphology similar to that of silica aerogels (see e.g. Ruffner, J. A.; Clem, P. G.; Tuttle, B. A.; Brinker, C. J.; Sriram, C. S.; Bullington, J. A. *Thin Solid Films* 1998, 332, 356. Loy, D. A.; Russick, E. M.; Yamanaka, S. A.; Baugher, B. M.; Shea, K. *J. Chem. Mater.* 1997, 9, 2264. Ruben, G. C.; Hrubesh, L. W.; Tillotson, T. M. *J. Non-Cryst. Solids* 1995, 186, 209). Consistent with the large void volume present in films prepared from sol C, XPS (90° takeoff angle, FIG. 7) detected photoemission from elemental silicon (2p) of the substrate on a sample bearing a 119-nm overlayer film. The close correspondence of the SEM and ellipsometric thicknesses is critical because it confirms the ellipsometric analyses that yielded the low refractive indices for these films. Taken together, the SEM and XPS results indicate that the films prepared from sol C contain voids throughout the layer. To verify that the pores were not continuous, micrographs of the same film prepared from sol C were obtained at three different electron-accelerating voltages (FIG. 8). These results show that as the accelerating voltage is increased, the amount of void space appears to decrease and be replaced with a morphology similar to that of the upper surfaces. The effect of increasing the electron-accelerating voltage used to obtain these micrographs is to increase the signal reaching the detector by increasing the volume of material that the electron beam interacts with—interaction volume (see e.g. Goldstein, J. I.; Newbury, D. E.; Echlin, P.;

Joy, D. C.; Romig, A. D.; Lyman, C. E.; Fiori, C.; Lifshin, E. *Scanning Electron Microscopy and X-ray Microanalysis: Text for Biologists, Materials Scientists, and Geologists*; Plenum Press: New York, 1992, Chapters 3 and 4). We infer from these micrographs that at low accelerating voltage, the number of secondary electrons emitted from within the void spaces and reaching the detector was lower than the contrast level set for image display (see e.g. Goldstein, J. I.; Newbury, D. E.; Echlin, P.; Joy, D. C.; Romig, A. D.; Lyman, C. E.; Fiori, C.; Lifshin, E. *Scanning Electron Microscopy and X-ray Microanalysis: Text for Biologists, Materials Scientists, and Geologists*; Plenum Press: New York, 1992, Chapters 3 and 4). Images are normally displayed by setting the dynamic range of the display such that the lowest signal level is just above that of black and the highest signal level is just below that of white (i.e., no saturation of signal). For these images, the contrast levels were set individually. Therefore, as the accelerating voltage was increased, the signal from the void spaces was of sufficient intensity to register as gray.

Effect of Relative Humidity and Post-*Treatment on Film Index and Thickness.* To remove the small amount of PDDA and residual ethoxy groups present within these films, they were heated at 500° C. in air for 10 h. X-ray photoelectron spectroscopy showed that this calcination resulted in a decrease in the amount of carbon present in a film formed from sol A from 6.7% to only 1.5% (survey spectra shown in FIG. 3b), and for the film formed from sol C from 5.5% to only 1.4%. For both films, the nitrogen was completely eliminated, to the limit of the sensitivity of the measurement (An individual film from sol A and C were cut into samples for XPS analysis for both the calcined and uncalcined states). Consistent with the removal of residual organic material, the refractive indices of the films decreased upon calcination, allowing films with indices as low as 1.14 ($V_p$ of 67%) to be formed. The index of films from sol A fell from 1.31–1.30 to 1.27–1.26; those from sol B fell from 1.26–1.24 to 1.23–1.21; and those from sol C fell from 1.17–1.15 to 1.16–1.14. The larger decrease in index seen for films prepared with sol A, compared to sol C, is consistent with those films having more organic content. The robustness of the films was evidenced by a mere ~1.8%, or less, reduction in film thickness in all cases upon calcination.

Figure 9:
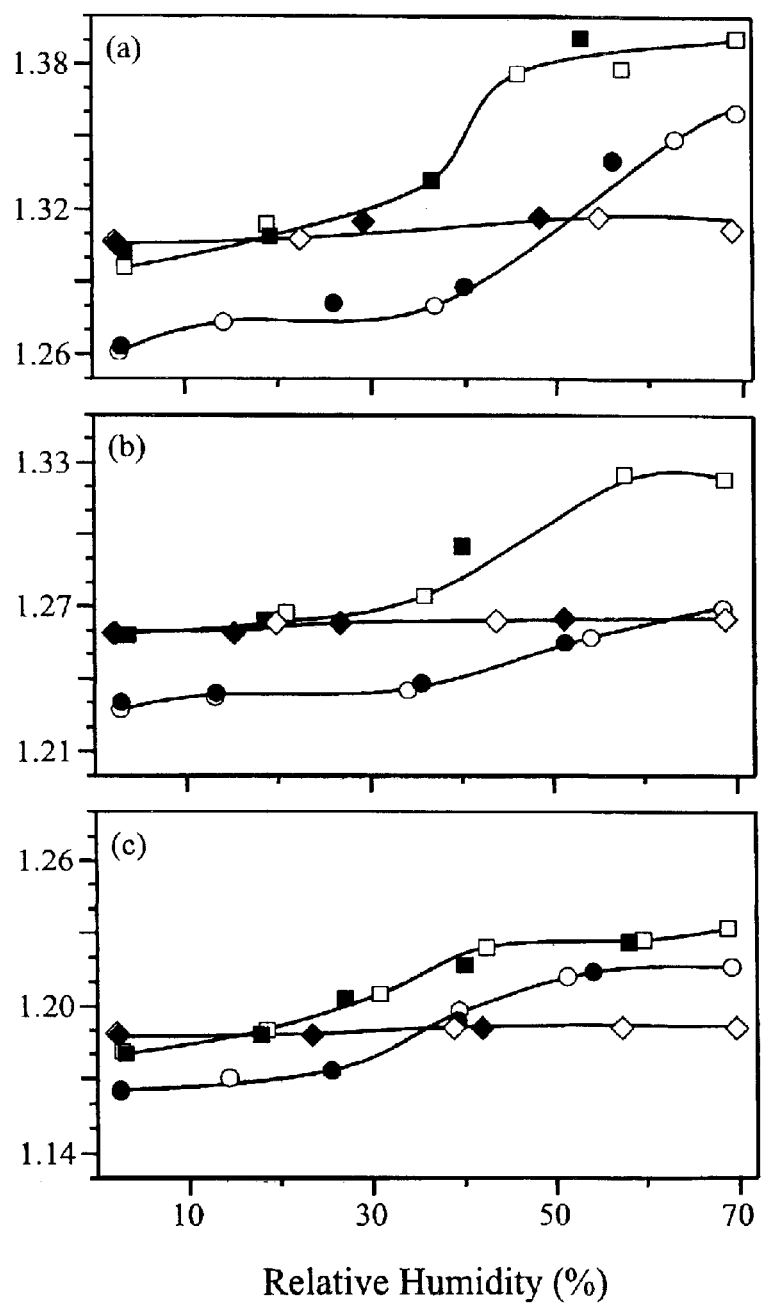
FIG. 9 shows refractive index as a function of relative humidity (RH) for films prepared with sol A (a), sol B (b), and sol C (c): as-absorbed (squares); after calcination at 500° C. for 10 h (circles); and after treatment with trimethylchlorosilane (triangles). The open symbols represent data obtained with increasing RH, and the filled symbols were obtained with decreasing RH. The lines drawn are guides for the eye. The y-axes on these graphs show different ranges.

As the relative humidity (RH) was increased from 3–70%, the refractive index of the as-adsorbed films also increased, and with the magnitude of the response scales with the refractive index at low-RH (FIG. 9). Increasing the humidity from 3 to 70% caused an ~0.09 increase in index for films prepared with sol A, versus ~0.07 and ~0.05 for film prepared with sol B and C, respectively. Nearly identical results were found using a second film prepared from each of the three sols. The larger effect that relative humidity has on the index of the films prepared with sol A is consistent with the SEM study showing that those films are composed of a more dense packing of ~10 nm silica particles than those prepared from either sol B or sol C. As the packing density of particles increases, the amount of hydrophilic surface area would also increase.

Although calcination caused the refractive index of the films prepared from each film to decrease, calcination only affected the response of films prepared with sol B (FIG. 9b). Films prepared with sol B had an average 50% reduction in the magnitude in refractive index change in going from 3–70% RH compared to the as-adsorbed data. For films prepared with sols A and C, the respective curves were only shifted to lower values but the magnitude of the response did not appear to be effected. The lack of change in humidity response indicates that either the calcination temperature was insufficient to cause condensation of silanol groups or that the structure within the films hindered such condensation. Despite the changes in the indexes of these films with RH, their thicknesses remained nearly constant within the experimental error associated with the measurement, indicating the rigidity of both the as-adsorbed and calcined films.

Figure 10:
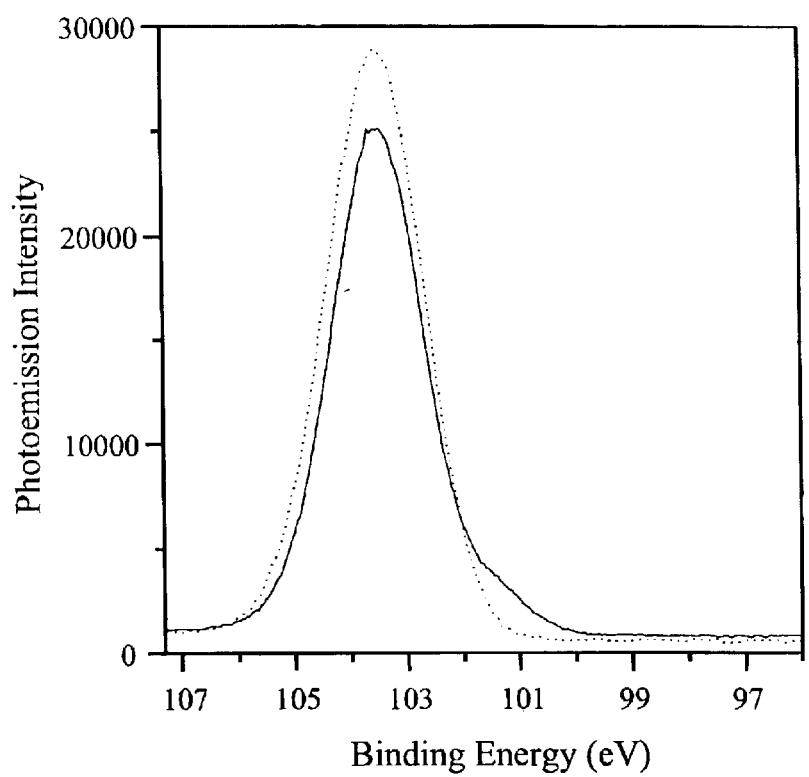
FIG. 10 shows high-resolution XPS spectra of the Si 2p region of a film prepared with sol A: (dotted line) after calcination at 500° C. in air for 10 h, and (solid line) after subsequent treatment with trimethylsilane.

Treatment of the calcined films with trimethylchlorosilane (TMSCI) vapor, a step that should convert the hydrophilic silanol groups to hydrophobic trimethylsilyl ethers (see e.g. Plueddemann, E. P. *Silane Coupling Agents*; Plenum Press: New York, 1982), produced films with indices that were independent of relative humidity. After 12 h of treatment at room temperature, the calcined films were removed from the vapor and heated at 110° C. for 10 h under dynamic vacuum to remove any unreacted TMSCI or hexamethyldisiloxane byproduct. A survey XPS spectrum of a TMSCI-treated film prepared from sol A showed a pronounced increase in carbon photoemission, from 5.5% to 13.7%, relative to the spectra obtained prior to treatment (FIG. 3c). A high-resolution XPS spectrum of the Si 2p region after TMSCI treatment (FIG. 10, solid line) showed a low binding energy shoulder at 101.5 eV (~8% of the silicon 2p photoemission), a component not present in the region prior to treatment (FIG. 10, dotted line) and at a position consistent with that reported by others for the trimethylsilyl ether (see e.g. Yang, H.-S.; Choi, S.-Y.; Hyun, S.-H.; Park, C.-G. *Thin Solid Films* 1999, 348, 69). Treatment with trimethylchlorosilane caused the indices of the films to increase to approximately their value before calcination (measured at 3% RH) and resulted in films that exhibited almost no change in index with humidity (FIG. 9). The slight changes in index seen are within the experimental error of the measurement. In addition, no change in film thickness was observed after TMSCI treatment.

As seen herein, adsorption of a polyelectrolyte and oligomeric species from a silica sol onto silicon substrates produces porous silica films with control over both refractive index and thickness. Films with indices as low as 1.16 and containing very little organic material were obtained. Scanning electron microscopy revealed that the low refractive were the result of a low packing density of the silica particles within these films. Calcination reduced the amount of organic material within these films to below 2%, with only a minor decrease in film thickness, and resulted in films with porosities of up to 67% and refractive index of 1.14. The refractive indexes of these films were affected by relative humidity, reflecting the hydrophilicity of the silica surface, an effect nearly eliminated by treatment of these films with trimethylchlorosilane. In addition to the tunability of the optical pathlength, the porous nature of these silica films may hold promise for their use as low-dielectric materials, as well as and in molecular separations.

Materials. Poly(diallyldimethylammonium chloride) (20% (w/w) aqueous solution, MW 200,000–350,000) was obtained from Aldrich and diluted to 0.25% (w/w) with Millipore Milli-Q water (15–16 MΩ). Absolute ethanol (McCormick), sodium hydroxide (99.99%, Aldrich), tetraethyl orthosilicate (TEOS, 98%, Acros), and trimethylchlorosilane (Aldrich, 99+%) were used as received.

Silicon (100) substrates (p-doped) were obtained from Si-Tech, Inc., cut into ~1-cm×~3.0-cm pieces, swabbed with absolute ethanol to remove any silicon dust, and cleaned in piranha solution (1:2 (v/v) 30% $H_2O_2$ and concentrated $H_2SO_4$). The clean wafers were rinsed thoroughly with Milli-Q water and dried with nitrogen. The thickness of the native oxide on these wafers was 1.6–1.8 nm.

Ellipsometric Analysis. The ellipsometric data were obtained on a Rudolph Auto-EL III nulling ellipsometer with a HeNe laser ($\lambda$=632.8 nm) at an angle of incidence of 70°. Four spots were measured at 4–7% relative humidity, unless otherwise noted and averaged for each sample (see e.g. Kleinfeld, E. R.; Ferguson, G. S. *Chem. Mater.* 1995, 7, 2327). The thickness of the multilayer was determined using a double-layer model and software supplied by the manufacturer (Program 222 on the Auto-EL III). This program utilizes the thickness and refractive index of the native oxide on silicon, as well as the refractive index of the silicon substrate, to determine the starting point for the calculation of the thickness and index of the sample film. Refractive indexes were also determined for films greater then ~80-nm in thickness using the same program (see e.g. Tompkins, H. G. *A User's Guide to Ellipsometry*; Academic Press: Boston, 1993, Chapters 1–3).

Scanning Electron Microscopy (SEM). Scanning electron micrographs were obtained on either a JEOL 6335 or 6700 Field Emission SEMs using a secondary electron detector. Samples were uncoated, mounted on aluminum stubs, and freshly cleaved if necessary. Images obtained on the 6700 FESEM were found to be of superior quality for a number of reasons. The use of a lower beam current coupled with a more sensitive detector minimized the amount of surface charging, a significant problem in imaging the cross-sectional samples with the 6335 FESEM, while still allowing sample contrast. Also the partial-in-the lens detector used in the 6700 FESEM allowed imaging at a shorter working distance than possible with the 6335 FESEM, equipped with a standard Everhart-Thornley detector, and thus higher resolution images were obtained.

X-ray Photoelectron Spectroscopy (XPS). X-ray photoelectron spectroscopy was performed using a Scienta ESCA300 (Uppsala, Sweden) with monochromatic Al—K$\alpha$ X-rays and at a working pressure of $10^{-9}$ mbar. Survey spectra were collected with a pass energy of 300 eV (1.0 eV steps), and high-resolution spectra were collected with a pass energy of 150 eV (0.05 eV steps). A takeoff angle between the surface of the film and the detector of 90° was used. Under our experimental conditions, peak resolution was limited by the inherent sample line width and not by instrumental factors. All spectra were referenced to the main Si 2p peak, set at 103.5 eV (see e.g. Moulder, J. F.; Stickle, W. F.; Sobol, P. E.; Bomden, K. D. In *Handbook of X-ray Photoelectron Spectroscopy*; Chastain, J., Ed.; Perkin-Elmer: Eden Prairie, Minn., 1992). The following sensitivity factors determined for the Scienta ESCA300 by A. Miller were used for quantitative analysis: O 1 s, 2.837; C 1 s, 1.000; Si 2p 0.960; N 1 s, 1.620.

Preparation of Silica Sols. Sols A and B were produced by adding tetraethoxysilicate (TEOS) to 100 mL of deionized water (pH between 6.0 and 6.5) to form a 0.01 M solution and stirred at 400 rpm (Variomag® Telenodul 20P stirrer). After 2 h, a sufficient amount of aqueous sodium hydroxide was added to produce either a 35:1 (sol A) or a 175:1 (sol B) molar ratio of TEOS to base. For sol A, the concentration of the aqueous sodium hydroxide added was ~0.05 M and for sol B it was ~0.02 M. The corresponding initial concentrations of base in these solutions were ~0.28 mM and ~0.057 mM for sol A and sol B, respectively. After 2 additional hours of stirring, the solution was divided into 20-mL portions that were continuously stirred at 400 rpm during aging and film formation. Sol C was prepared by adding TEOS directly to 100 mL of aqueous sodium hydroxide to form a 0.01 M solution of TEOS and having an initial molar ratio of TEOS to base of 175:1. The solution was stirred for 4 h at 400 rpm, after which it was divided into 20-ml portions that were continuously stirred at 400 rpm during aging and film formation. A solution "batch" refers to films prepared from the same initial 0.01 M TEOS solution.

Multilayer Preparation. A clean silicon wafer was rinsed with Milli-Q water and dried with nitrogen. The wafer was suspended vertically in the 0.25% (w/w) PDDA solution and after 3 min rinsed with Milli-Q water and dried with $N_2$. Rinsing and drying was then repeated. The same process was followed for one of the silica sols, stirred at 400 rpm. An adsorption of PDDA followed by an adsorption of silica constitutes one adsorption cycle.

Calcination of As-Adsorbed PDDA/Sol Multilayers. As-adsorbed multilayer films were placed film-side up on porous alumina blocks and heated in a L+L® series furnace at 500° C. in air for 10 h. The furnace was heated at a rate of 5° C./min and cooled at a rate of ~1° C./min back to room temperature.

Treatment of Calcined Films with Trimethylchlorosilane. Calcined films were placed diagonally in a 20-mL vial with the film facing toward the bottom of the vial, a glass slide spacer was used to separate the film from the bottom of the vial. One drop (~0.01 mL) of trimethylchlorosilane (TMSCI) was placed in the bottom of the vial and then the vial was sealed under air for 12 h. To remove any unreacted TMSCI or other byproducts, the film was placed in a VWR Scientific 1410 series vacuum oven and heated under dynamic vacuum at 110° C. for 10 h.

Response of Films to Humid Nitrogen. Multilayer films were exposed to various levels of RH both before and after calcination, and after TMSCI treatment. The RH was cycled between ~2% and ~70%, with ellipsometric measurements taken 5 and 10 min after the RH calibrator (Vaisala HMC 20) had equilibrated at each value of RH. The apparatus and this procedure have been described in more detail previously (see e.g. Yang, H.-S.; Choi, S.-Y.; Hyun, S.-H.; Park, C.-G. *Thin Solid Films* 1999, 348, 69).

The invention has been described with reference to particular preferred embodiments, but variations within the spirit and scope of the invention will occur to those skilled in the art. As examples, other positively charged polyelectrolytes such as poly(allylamine) or polyeneimine could be used; other silica precursors such as tetramethoxysilane (TMOS) or methyltriethoxysilane could be used; other substrates, such as glass or quartz could be used; and other silanes having a Si to Cl bond could be used.

What is claimed is:

1. A method of forming a porous silica film, comprising the steps of:
   a) providing a substrate;
   b) coating, on a surface of said substrate, a layer of positively charged polyelectrolyte;
   c) applying an aged silica-bearing non-colloidal solution to said coated surface of said substrate to adsorb porous silica thereon.

2. The method as defined by claim 1, wherein steps (b) and (c) together comprise an adsorption cycle, and further comprising repeating said adsorption cycle a number of times.

3. The method as defined by claim 2, wherein said step of applying a silica-bearing solution to said coated surface comprises applying a solution of TEOS.

4. The method as defined by claim 3, wherein said solution of TEOS is an aqueous solution.

5. The method as defined by claim 4, wherein said solution of TEOS is an aqueous solution of TEOS and a base.

6. The method as defined by claim 5, wherein said base is sodium hydroxide.

7. The method as defined by claim 6, wherein the molar ratio of TEOS to base is at least 35:1.

8. The method as defined by claim 6, wherein the molar ratio of TEOS to base is about 175:1.

9. The method as defined by claim 5, wherein said step (b) of coating on a surface of said substrate a layer of charged polyelectrolyte comprises applying to said surface an aqueous solution of PDDA.

10. The method as defined by claim 5, further comprising the step of heating the porous silica after the formation thereof.

11. The method as defined by claim 5, further comprising treating said porous silica with a silane compound after the formation thereof.

12. The method as defined by claim 11, wherein said silane compound comprises TMSCI vapor.

13. The method as defined by claim 3, wherein said TEOS solution is aged for at least one day.

14. The method as defined by claim 3, wherein said TEOS solution is aged for a plurality of days.

15. The method as defined by claim 2, wherein said step (b) of coating on a surface of said substrate a layer of charged polyelectrolyte comprises applying to said surface an aqueous solution of PDDA.

16. The method as defined by claim 15, wherein said step (b) further comprises rinsing and drying of said layer.

17. The method as defined by claim 15, wherein said step (a) comprises providing a silicon substrate.

18. The method as defined by claim 15, wherein said step (a) comprises providing a silicon substrate having a hydroxylated native oxide surface.

19. The method as defined by claim 15, further comprising the step of heating the porous silica after the formation thereof.

20. The method as defined by claim 2, wherein said step (a) comprises providing a silicon substrate.

21. The method as defined by claim 2, further comprising the step of heating the porous silica after the formation thereof.

22. The method as defined by claim 21, further comprising treating said porous silica with a silane compound after the formation thereof.

23. The method as defined by claim 22, wherein said silane compound comprises TMSCI vapor.

24. The method as defined by claim 2, further comprising treating said porous silica with a silane compound after the formation thereof.

25. The method as defined by claim 2, wherein the age and concentration of said silica-bearing solution are selected to control the porosity and the index of refraction of said porous silica film.

26. The method as defined by claim 25, wherein said number of adsorption cycles is selected to control thickness of said porous silica film.

* * * * *